(12) United States Patent
Park et al.

(10) Patent No.: US 9,433,022 B2
(45) Date of Patent: Aug. 30, 2016

(54) METHOD AND APPARATUS FOR FILTERING-BASED SCANNING IN WLAN SYSTEM

(71) Applicant: LG ELECTRONICS INC., Seoul (KR)

(72) Inventors: Giwon Park, Anyang-si (KR); Jaehyung Song, Anyang-si (KR); Jinsam Kwak, Anyang-si (KR); Kiseon Ryu, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 44 days.

(21) Appl. No.: 14/378,914

(22) PCT Filed: Feb. 14, 2013

(86) PCT No.: PCT/KR2013/001156
§ 371 (c)(1),
(2) Date: Aug. 14, 2014

(87) PCT Pub. No.: WO2013/122398
PCT Pub. Date: Aug. 22, 2013

(65) Prior Publication Data
US 2016/0007386 A1 Jan. 7, 2016

Related U.S. Application Data

(60) Provisional application No. 61/602,564, filed on Feb. 23, 2012, provisional application No. 61/598,355, filed on Feb. 14, 2012, provisional application No. 61/598,354, filed on Feb. 14, 2012.

(51) Int. Cl.
*H04W 76/02* (2009.01)
*H04W 48/06* (2009.01)
*H04W 48/14* (2009.01)
*H04W 48/16* (2009.01)
(Continued)

(52) U.S. Cl.
CPC ............. *H04W 76/02* (2013.01); *H04W 48/06* (2013.01); *H04W 48/10* (2013.01); *H04W 48/14* (2013.01); *H04W 48/16* (2013.01); *H04W 84/12* (2013.01)

(58) Field of Classification Search
CPC .................................................. H04W 48/06
See application file for complete search history.

(56) References Cited

U.S. PATENT DOCUMENTS

2011/0261755 A1  10/2011  Cordeiro et al.
2013/0155933 A1* 6/2013  Kneckt ............... H04W 74/002
                                                370/312

OTHER PUBLICATIONS

Kneckt, et al., "Scanning with FILS," doc.: IEEE 802.11-yy/xxxxr0, IEEE Draft, XP017672899, Jan. 2012, 14 pages.
(Continued)

*Primary Examiner* — John Blanton
(74) *Attorney, Agent, or Firm* — Lee, Hong, Degerman, Kang & Walmey; Jonathan Kang; Michael Monaco

(57) ABSTRACT

The present invention relates to a wireless communication system, and more specifically, disclosed are a method and an apparatus for filtering-based scanning in a WLAN system. A method for a station (STA) setting up a high-speed link in the wireless communication system, according to one embodiment of the present invention, comprises the steps of: transmitting a first frame comprising filtering information to at least one access point (AP); and receiving a second frame from a portion or all of the at least one AP, wherein whether to transmit the second frame can be determined on the basis of the filtering information.

11 Claims, 11 Drawing Sheets

(51) Int. Cl.
*H04W 48/10* (2009.01)
*H04W 84/12* (2009.01)

(56) References Cited

OTHER PUBLICATIONS

European Patent Office Application Serial No. 13749934.9, Search Report dated Oct. 5, 2015, 6 pages.

Yunoki, "Proposal of Fast AP Discovery," doc.: IEEE 11-12/0013r0, Jan. 2012, 28 pages.

Emmelmann, et al., "Requirements for FILS Submissions coming from PAR & 5C," doc.: IEEE 802.11-11/0119r00, Jan. 2011, 6 pages.

Kneckt, et al., "Active Scanning Enabling FILS," doc.: IEEE 802.11-11/1619r3, Jan. 2012, 15 pages.

PCT International Application No. PCT/KR2013/001156, Written Opinion of the International Searching Authority dated Jun. 27, 2013, 1 page.

* cited by examiner

FIG. 8

(a) | Element ID | Length | ProbeRequestFrame RSSI |
Octets: 1, 1, 1

(b) | Element ID | Length | Recommended CINR |
Octets: 1, 1, 1

(c) | Element ID | Length | Recommended SNR |
Octets: 1, 1, 1

FIG. 9

| Element ID | Length | NetworkCharging |
|---|---|---|
| 1 | 1 | 1 |

Octets:

METHOD AND APPARATUS FOR FILTERING-BASED SCANNING IN WLAN SYSTEM

CROSS-REFERENCE TO RELATED APPLICATIONS

This application is the National Stage filing under 35 U.S.C. 371 of International Application No. PCT/KR2013/001156, filed on Feb. 14, 2013, which claims the benefit of U.S. Provisional Application Ser. No. 61/598,354, filed on Feb. 14, 2012, 61/598,355, filed on Feb. 14, 2012, and 61/602,564, filed on Feb. 23, 2012, the contents of which are all hereby incorporated by reference herein in their entirety.

TECHNICAL FIELD

The following descriptions relate to a wireless communication system and, more specifically, to a method and an apparatus for filtering-based scanning in a WLAN system.

BACKGROUND ART

With the growth of information communication technology, various wireless communication technologies are under development. Among the wireless communication technologies, wireless local area network (WLAN) technology enables wireless Internet access at home or in offices or specific service provision areas using a mobile terminal such as a personal digital assistant (PDA), laptop computer, portable multimedia player (PMP) or the like on the basis of radio frequency technology.

To overcome the limitations of communication rate, which have been blamed for a weak point of WLAN, recent technical standards have introduced systems with increased network rate and reliability and extended wireless network coverage. For example, IEEE 802.11n supports high throughput (HT) of a data rate of 540 Mbps or higher and introduces MIMO (Multiple Input Multiple Output) technology which uses multiple antennas for both a transmitter and a receiver in order to minimize a transmission error and optimize a data rate.

IEEE 802.11ai is developed as new standards for supporting fast initial link setup for stations (STAs) that support IEEE 802.11 at a MAC (Medium Access Control) layer of IEEE 802.11 systems. IEEE 802.11ai aims to provide technologies for supporting high-speed link setup in a situation in which so many people leave previously connected WLAN coverage and substantially simultaneously access a new WLAN in the case of public transportation transfer, for example. In addition, IEEE 803.11ai has characteristics of security framework, IP address assignment, fast network discovery, etc.

DISCLOSURE

Technical Problem

Technology providing fast link setup (or fast session setup) is required when many users substantially simultaneously attempt network access or a very large number of terminals substantially simultaneously perform a random access procedure, as described above. However, a detailed scheme for fast link setup has not yet been provided.

An object of the present invention devised to solve the problem lies in a method for minimizing link setup latency by improving an operation of a station (STA) to access an access point (AP).

The technical problems solved by the present invention are not limited to the above technical problems and those skilled in the art may understand other technical problems from the following description.

Technical Solution

The object of the present invention can be achieved by providing a method for performing, by a station (STA), fast link setup in a wireless communication system, including: transmitting, to one or more access points (APs), a first frame including filtering information; and receiving, from a portion or all of the APs, a second frame, wherein whether the second frame is transmitted is determined on the basis of the filtering information.

In another aspect of the present invention, provided herein is a method for supporting, by an AP, fast link setup in a wireless communication system, including: receiving a first frame including filtering information from an STA; and transmitting a second frame to the STA, wherein whether the second frame is transmitted is determined on the basis of the filtering information.

In another aspect of the present invention, provided herein is an STA performing fast link setup in a wireless communication system, including: a transceiver; and a processor, wherein the processor is configured to transmit, to one or more APs, a first frame including filtering information using the transceiver and to receive, from a portion or all of the APs, a second frame using the transceiver, wherein whether the second frame is transmitted is determined on the basis of the filtering information.

In another aspect of the present invention, provided herein is an AP supporting fast link setup in a wireless communication system, including: a transceiver; a processor, wherein the processor is configured to receive a first frame including filtering information from an STA using the transceiver and to transmit a second frame to the STA using the transceiver, wherein whether the second frame is transmitted is determined on the basis of the filtering information.

The following is commonly applicable to the aforementioned embodiments of the present invention.

The filtering information may include a received signal strength limit value.

The portion or all of the APs may include an AP having a received signal strength of the first frame, the received signal strength exceeding the received signal strength limit value.

The filtering information may include charging type information.

The portion or all of the APs may include an AP conforming to a charging policy matching the charging type information.

An AP not satisfying conditions according to the filtering information may defer transmission of the second frame.

Configuration information about a time for which transmission of the second frame is deferred may be included in the first frame.

The first frame may be broadcast to the one or more APs.

The first frame may be a probe request frame and the second frame may be a probe response frame.

The above description and the following detailed description of the present invention are exemplary and are for additional explanation of the invention disclosed in the claims.

Advantageous Effects

According to the present invention, it is possible to provide a method for minimizing link setup latency by improving an operation of an STA to access an AP.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 8 illustrates examples of information elements that can be used as filtering information according to the present invention;

FIG. 9 illustrates an example of an information element that can be used as filtering information according to the present invention;

BEST MODE

Figure 1:
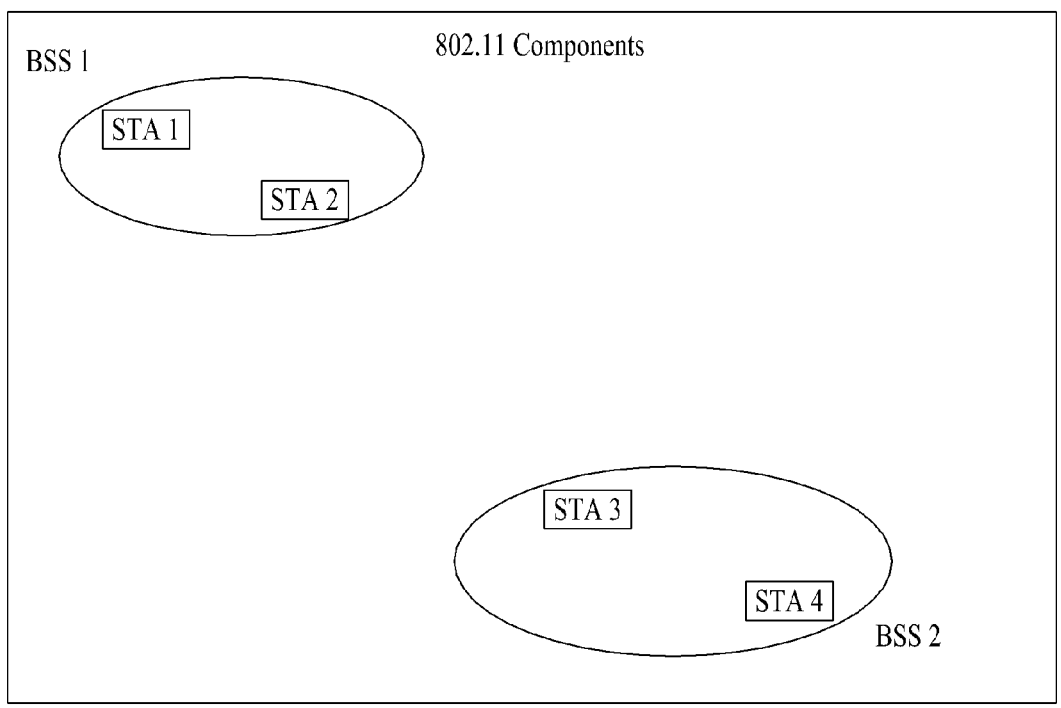
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3GPP, 3GPP LTE, LTE-A, and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

Configuration of WLAN System

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
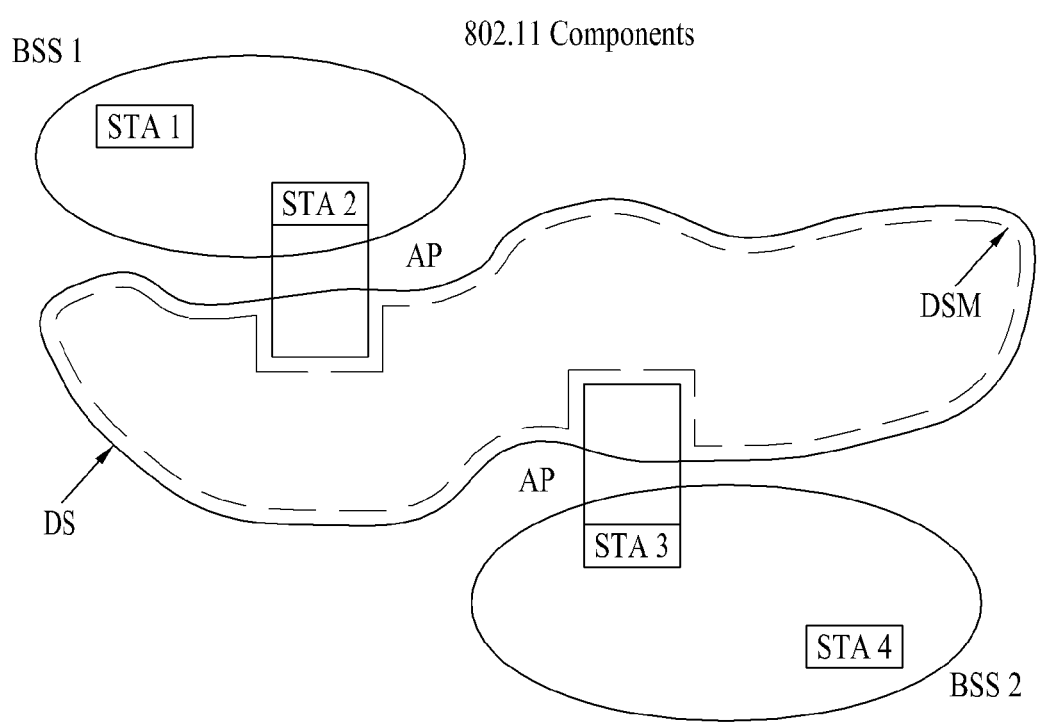
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 shown in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
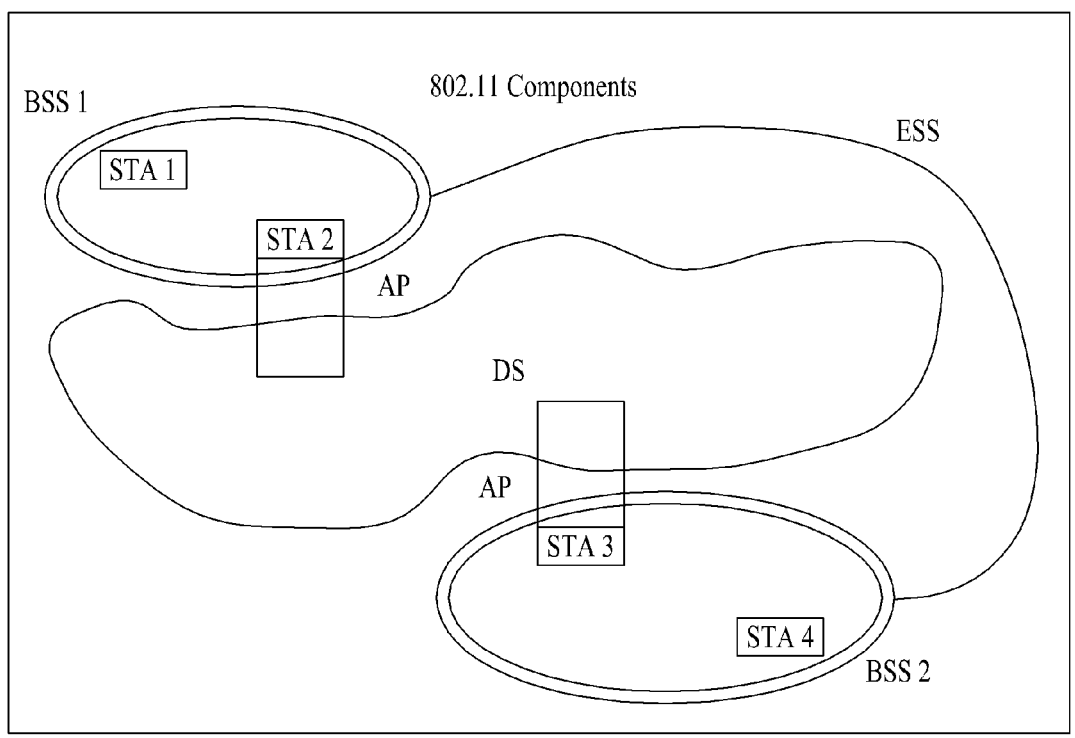
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and BSSs. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
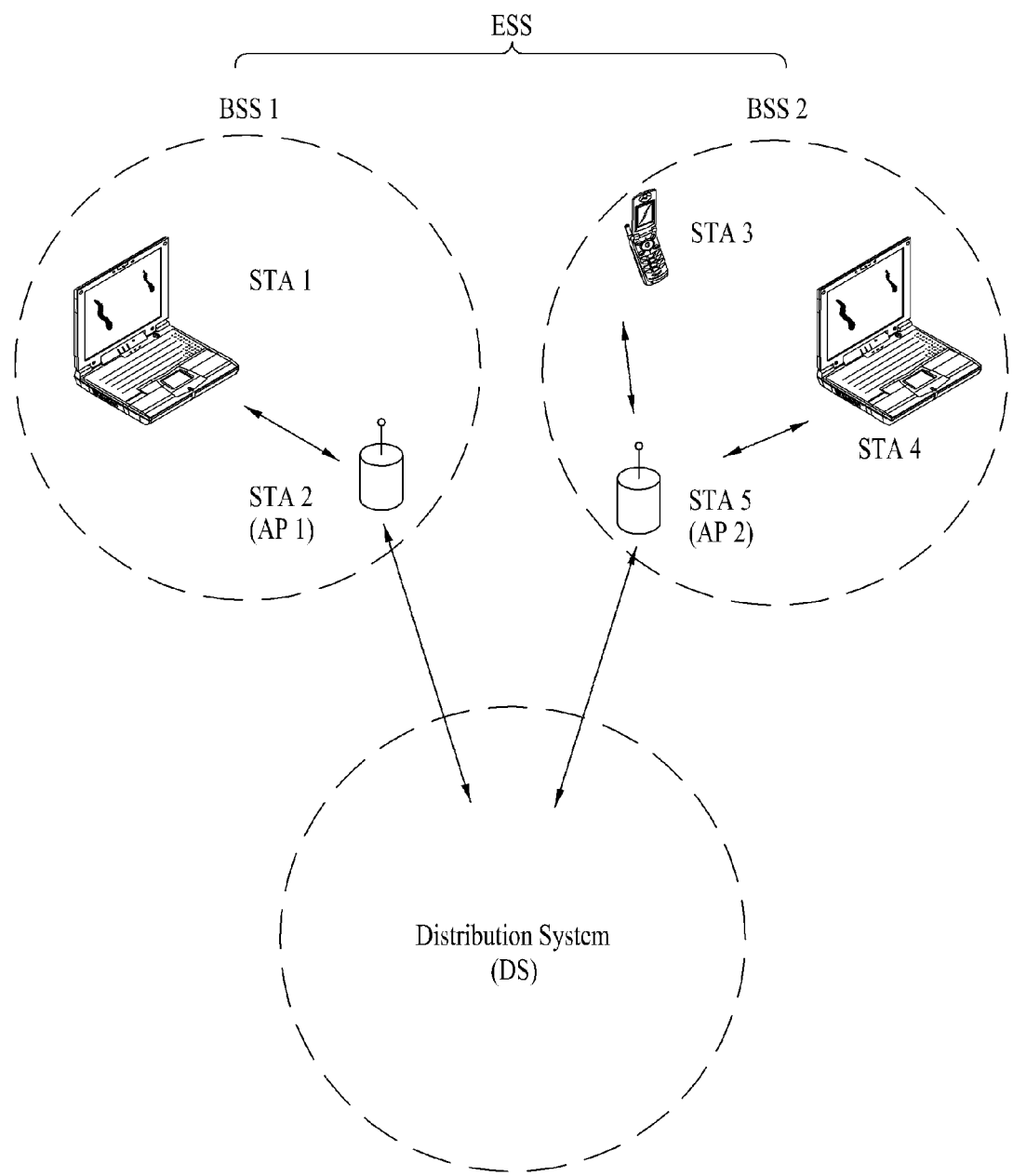
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc in other wireless communication fields.

Link Setup Procedure

Figure 5:
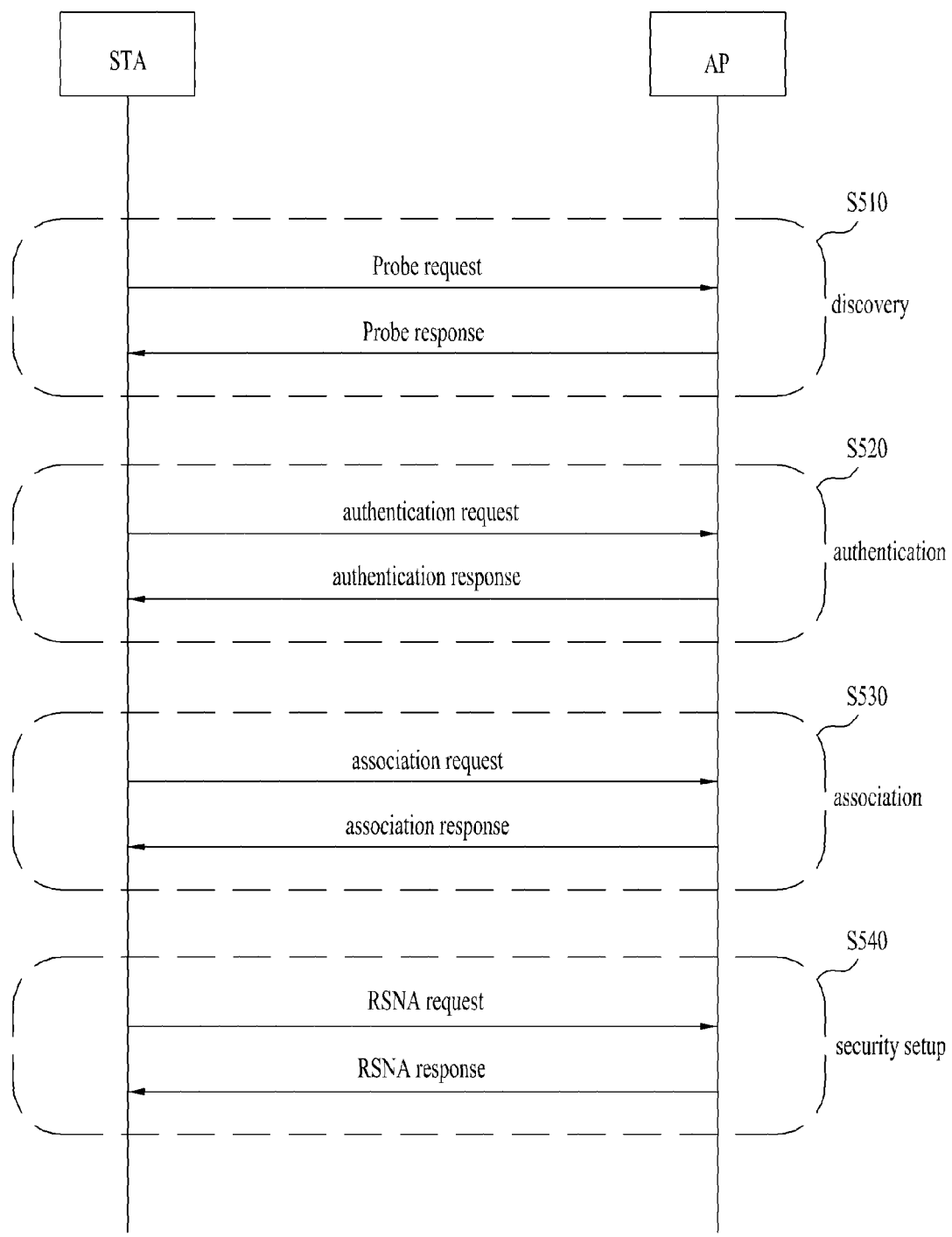
FIG. 5 illustrates a general link setup procedure.

FIG. 5 illustrates a general link setup procedure.

To sets up a link to a network and transmit/receive data, an STA needs to discover the network, perform authentication, establish association and pass through an authentication procedure for security. The link setup procedure may be called a session initiation procedure and a session setup procedure. In addition, discovery, authentication, association and security establishment of the link setup procedure may be called an association procedure.

An exemplary link setup procedure will now be described with reference to FIG. 5.

The STA may discover a network in step S510. Network discovery may include a scanning operation of the STA. That is, the STA needs to discover a network that can participate in communication in order to access the network. The STA needs to identify a compatible network prior to participating in a wireless network. A procedure of identifying a network present in a specific area is referred to as scanning.

Scanning includes active scanning and passive scanning.

FIG. 5 illustrates network discovery operation including active scanning. The STA performing active scanning transmits a probe request frame in order to search surrounding APs while changing channels and waits for a response to the probe request frame. A responder transmits a probe response frame in response to the probe request frame to the STA. Here, the responder may be an STA that has finally transmitted a beacon frame in a BSS of a channel being scanned. An AP corresponds to a responder in a BSS since the AP transmits a beacon frame, whereas a responder is not fixed in an IBSS since STAs in the IBSS transmit a beacon frame in rotation. For example, an STA, which has transmitted a probe request frame on channel #1 and has received a probe response frame on channel #1, may store BSS related information included in the received probe response frame, move to the next channel (e.g. channel #2) and perform scanning (i.e. probe request/response transmission and reception on channel #2) in the same manner.

The scanning operation may be performed in a passive scanning manner, which is not shown in FIG. 5. An STA performing passive scanning waits for a beacon frame while changing channels. The beacon frame, one of management frames in IEEE 802.11, indicates presence of a wireless network and is periodically transmitted to the STA performing scanning to enable the STA to discover and participate in the wireless network. An AP periodically transmits the beacon frame in the BSS, whereas STAs in the IBSS transmit the beacon frame in rotation in the case of IBSS. Upon reception of the beacon frame, the STA performing scanning stores information about the BSS, included in the beacon frame, and records beacon frame information in each channel while moving to another channel. The STA that has received the beacon frame may store BSS related information included in the received beacon frame, move to the next channel and perform scanning on the next channel through same method.

Comparing active scanning with passive scanning, active scanning has advantages of smaller delay and lower power consumption than passive scanning.

Upon discovery of the network, authentication may be performed on the STA in step S520. This authentication procedure may be referred to as first authentication to be discriminated from security setup operation of step S540, which will be described later.

Authentication includes a procedure through which the STA transmits an authentication request frame to the AP and a procedure through which the AP transmits an authentication response frame to the STA in response to the authentication request frame. An authentication frame used for authentication request/response corresponds to a management frame and may include information as shown in Table 1.

In Table 1, the authentication algorithm number field indicates a single authentication algorithm, and has a length of 2 octets. For example, authentication algorithm number field values 0, 1, 2 and 3 respectively indicate an open system, a shared key, fast BSS transition and simultaneous authentication of equals (SAE).

The authentication transaction sequence number field indicates a current status from among multiple transaction steps and has a length of 2 octets.

The status code field is used in a response frame, indicates success or failure of a requested operation (e.g. authentication request) and has a length of 2 octets.

The challenge text field includes a challenge text in authentication exchange and has a length determined according to authentication algorithm and transaction sequence number.

The RSN (Robust Security Network) field includes cipher related information and has a length of up to 255 octets. An RSNE (RSN Element) is included in an FT (Fast BSS Transition) authentication frame. The mobility domain field includes mobility domain identifier MD ID, FT capability and policy fields and may be used for an AP to advertise an AP group (i.e. a set of APs that form a mobility domain) to which the AP belongs. The fast BSS transition field includes information necessary to perform an FT authentication sequence during fast BSS transition in an RSN. The timeout interval field includes a reassociation deadline interval. The resource information container (RIC) field refers to a set of one or more elements related to a resource request/response and may include a varying number of elements (i.e. elements indicating resources).

The finite cyclic group field indicates a cryptographic group used in SAE exchange and has an unsigned integer value indicating a finite cyclic group. The anti-clogging token field is used for SAE authentication for protecting denial-of-service and is composed of a random bit string.

TABLE 1

| Order | Information | Notes |
|---|---|---|
| 1 | Authentication algorithm number | |
| 2 | Authentication transaction sequence number | |
| 3 | Status code | The status code information is reserved in certain Authentication frames. |
| 4 | Challenge text | The challenge text element is present only in certain Authentication frames. |
| 5 | RSN | The RSNE is present in the FT Authentication frames. |
| 6 | Mobility Domain | The MDE is present in the FT Authentication frames. |
| 7 | Fast BSS Transition | An FTE is present in the FT Authentication frames. |
| 8 | Timeout Interval (reassociation deadline) | A Timeout Interval element (TIE) containing the reassociation deadline interval is present in the FT Authentication frames. |
| 9 | RIC | A Resource Information Container, containing a variable number of elements, is present in the FT Authentication frames. |
| 10 | Finite Cyclic Group | An unsigned integer indicating a finite cyclic group. This is present in SAE authentication frames |
| 11 | Anti-Clogging Token | A random bit-string used for anti-clogging purposes. This is present in SAE authentication frames. |
| 12 | Send-Confirm | A binary encoding of an integer used for anti-replay purposes. This is present in SAE authentication frames |
| 13 | Scalar | An unsigned integer encoded. This is present in SAE authentication frames |
| 14 | Element | A field element from a finite field encoded. This is present in SAE authentication frames |
| 15 | Confirm | An unsigned integer encoded. This is present in SAE authentication frames |
| Last | Vendor Specific | One or more vendor-specific elements are optionally present. These elements follow all other elements. |

The send-confirm field is used for response prevention in SAE authentication and has a binary coded integer. The scalar field is used for exchange cipher related information in SAE authentication and has an encoded unsigned integer. The element field is used for exchange of a finite field element in SAE authentication. The confirm field is used to verify possession of an encryption key in SAE authentication and has an encoded unsigned integer.

The vendor specific field may be used for vendor-specific information that is not defined in IEEE 802.11.

Table 1 shows some information that may be included in an authentication request/response frame and the authentication request/response frame may further include additional information.

The STA may transmit the authentication request frame including one or more fields shown in Table to the AP. That AP may determine to permit authentication of the STA on the basis of information included in the received authentication request frame. The AP may provide an authentication result to the STA through the authentication response frame including one or more fields shown in Table 1.

Upon successful authentication of the STA, association may be performed in step S530. Association includes a procedure through which the STA transmits an association request frame to the AP and a procedure through which the AP transmits an association response frame to the STA in response to the association request frame.

For example, the association request frame may include information related to various capabilities, a beacon listen interval, a service set identifier (SSID), supported rates, supported channels, RSN, mobility domain, supported operating classes, TIM (Traffic Indication Map) broadcast request, interworking service capability, etc.

For example, the association response frame may include information related to various capabilities, a status code, AID (Association ID), supported rates, EDCA (Enhanced Distributed Channel Access) parameter set, RCPI (Received Channel Power Indicator), RSNI (Received Signal to Noise Indicator), mobility domain, timeout interval (association comeback time), overlapping BSS scan parameter, TIM broadcast response, QoS map, etc.

The aforementioned information is part of information that may be included in the association request/response frame and additional information may be further included in the association request/response frame.

Upon successful association of the STA with the network, security setup may be performed in step S540. Security setup in step S540 may be regarded as authentication through an RSNA (Robust Security Network Association) request/response. Authentication of step S520 may be referred to as first authentication and security setup of step S540 may be referred to as authentication.

Security setup of step S540 may include private key setup through 4-way handshaking using an EAPOL (Extensible Authentication Protocol over LAN) frame. In addition, security setup may be performed according to a security scheme that is not defined in IEEE 802.11.

Figure 6:
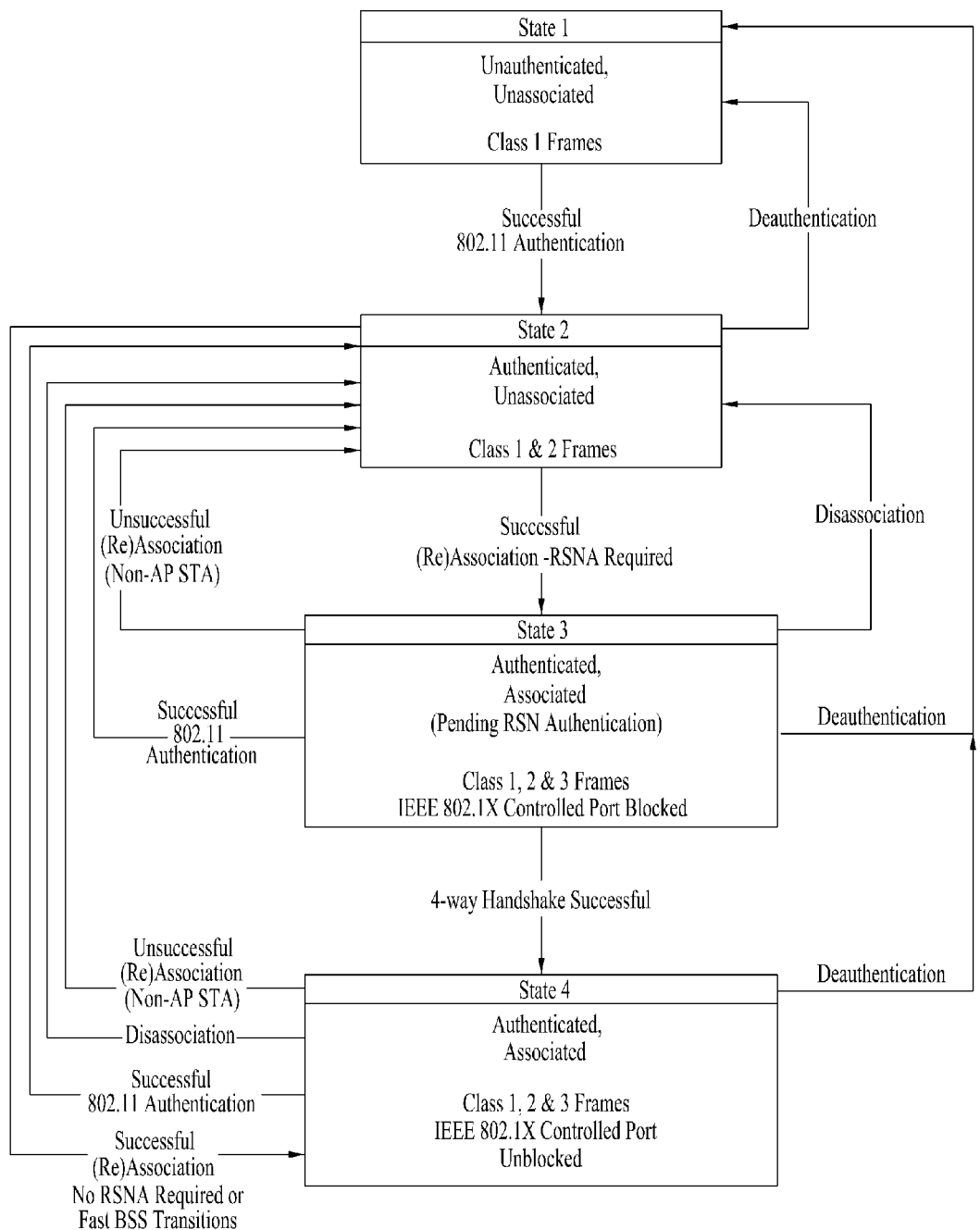
FIG. 6 illustrates state transition of an STA.

FIG. 6 illustrates the concept of state transition of an STA. FIG. 6 shows only events causing state transition for clarity.

State 1 is an unauthenticated and unassociated state of the STA. The STA in this state can transmit/receive class-1 frames only to/from other STAs. The class-1 frames include management frames such as a probe request/response frame, beacon frame, authentication frame, deauthentication frame and the like, for example.

Upon successful authentication of the STA in state 1 (e.g. authentication corresponding to S520 of FIG. 5), station 1 is changed to state 2. That is, state 2 is an authenticated but unassociated state. The STA in state 2 can transmit/receive class-1 and class-2 frames only to/from other STAs. The class-2 frames include management frames such as an association request/response frame, reassociation request/response frame, diassociation frame and the like, for example.

When the STA in state 2 is deauthenticated, state 2 is changed to state 1. When the STA in state 2 is successfully associated and RSNA is not required or in the case of fast BSS transition, state 2 is directly changed to state 4.

Upon successful association (or reassociation) of the STA in state 2, state 2 is changed to state 3. That is, state 3 is an authenticated and associated state in which RSNA authentication (e.g. security setup corresponding to step S540 of FIG. 5) is not completed. While the STA can transmit/receive class-1, 2 and 3 frames to/from other STAs in state 3, an IEEE 802.1x control port is blocked. Class-3 frames include management frames such as a data frame, action frame and the like and control frames such as a block ACK frame and the like, transmitted/received in an infrastructure BSS.

When the STA is deassociated or fails to be associated in state 3, state 3 is returned to state 2. When the STA is deauthenticated in state 3, state 3 is returned to state 1.

Upon successful 4-way handshaking of the STA in state 3, state 3 is changed to state 4. In state 4, the STA is authenticated and associated and thus can transmit class-1, 2 and 3 frames, and the IEEE 802.1x control port is unblocked.

When the STA is deassociated or fails to be associated in state 4, state 4 is returned to state 2. When the STA is deauthenticated in state 4, state 4 is returned to state 1.

Enhanced Link Setup Procedure

In the aforementioned link setup procedure defined in the current wireless communication system (e.g. WLAN system), message exchange needs to be performed through a beacon or a probe request/response (i.e. network discovery), authentication request/response (i.e. first authentication), association request/response (i.e. association) and RSNA request/response (i.e. authentication).

This link setup procedure causes large overhead (or quantity of information) and long latency in message exchange. In addition, when a large number of STAs perform scanning (or network discovery) for an AP, flood of message exchange for scanning may occur. For example, according to conventional active scanning, when an STA transmits a probe request message, even an AP that cannot be associated with the STA may transmit a probe response, which corresponds to unnecessary message exchange. Particularly, generation of unnecessary traffic or overload in a WLAN system supporting contention based channel access causes data transfer rate deterioration, initial link setup speed decrease and the like.

The present invention provides a method for solving the aforementioned problem by improving a probe request/response operation in a procedure through which an STA discovers an AP.

Embodiment 1

The present embodiment provides a probe request/response operation based on selective filtering information. To this end, a probe request frame may include filtering information. Specifically, a probe request message, transmitted from an STA for AP discovery (or channel scanning), may include information for discriminating an AP that needs to respond to the probe request from an AP that need not respond to the probe request. Accordingly, transmission of a probe response message (or probe response frame) from the AP that need not respond to the probe request can be prevented and thus traffic overload is not generated. In addition, since time required for an operation of transmitting an unnecessary message can be used for other operations, link setup speed can be improved.

Figure 7:
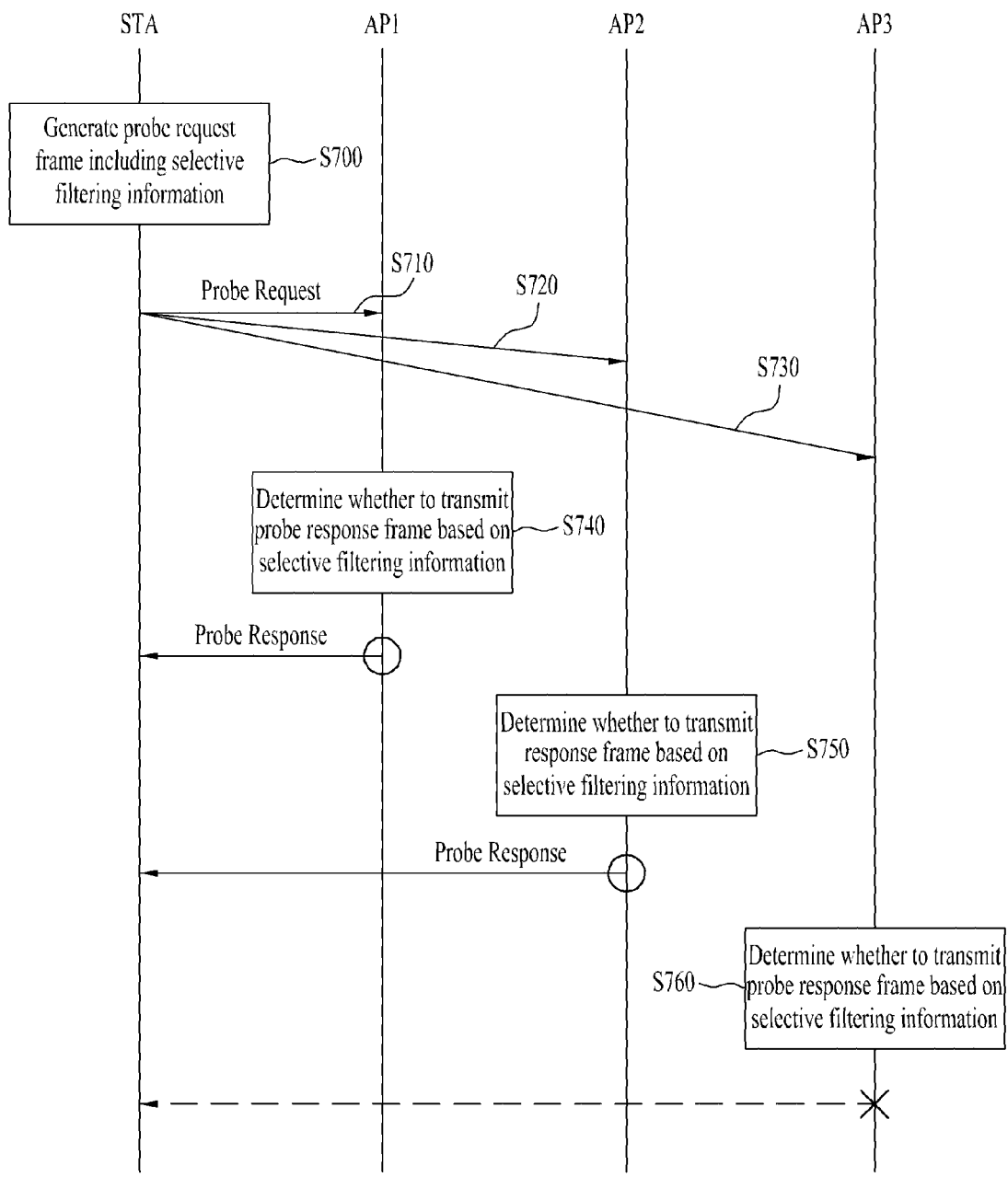
FIG. 7 illustrates a filtering-based probe request/response operation according to an embodiment of the present invention.

FIG. 7 illustrates a filtering-based probe request/response operation according to an embodiment of the present invention.

An STA may generate a probe request frame and transmit the probe request frame to AP1, AP2 and AP3 in step S700. The probe request frame may include filtering information. The filtering information may be information for specifying an AP that needs to respond to the probe request frame or information for specifying an AP that need not respond to the probe request frame.

The probe request frame may be transmitted in steps S710, S720 and S730. Here, the probe request frame may be broadcast to the APs or unicast to each AP.

Upon reception of the probe request frame, AP1, AP2 and AP3 may recognize the filtering information included in the probe request frame in steps S710, S720 and S730. AP1, AP2 and AP3 may determine whether to transmit a probe response frame on the basis of the filtering information. For example, each AP may determine or check whether it is an AP that needs to respond to the probe request frame or an AP that need not respond to the probe request frame) and determine whether to transmit the probe response frame. That is, an AP may determine transmission of the probe response frame to the STA upon confirming that the AP corresponds to the AP that needs to respond to the probe request frame on the basis of the filtering information.

The example of FIG. 7 is based on the assumption that AP1 and AP2 need to respond to the probe request frame and AP3 need not respond to the probe request frame. Accordingly, AP1 may transmit the probe response frame to the STA in step S740 and AP2 may transmit the probe request frame to the STA in step S750. AP3 determines that the probe response frame is not transmitted to the STA in step S760.

In this manner, the filtering information can be included in the probe request frame to prevent an unnecessary probe response frame from being transmitted from an AP to the STA. Accordingly, generation of unnecessary traffic can be prevented to improve network transfer rate and increase initial link setup speed of the STA.

Embodiment 2

The present embodiment is an example of the selective filtering based probe request/response scheme of embodiment 1 and relates to a method of using channel condition information as the filtering information.

Channel conditions may be represented as a received signal strength limit value and RSSI (Received Signal Strength Indicator), CINR (Carrier to Interface Ratio), SNR (Signal to Noise Ratio) and the like may be used as the channel conditions. For example, when the STA performs the probe request/response operation in order to discover an AP, the probe response frame may be transmitted from an AP (or APs) expected to satisfy channel conditions higher than a predetermined reference value. That is, channel conditions higher than the predetermined reference value may be represented as signal strength, and higher transfer rate can be expected as the signal strength increases. An AP may operate to transmit the probe response frame only when the received signal strength of the received probe request frame exceeds a predetermined limit so as to perform the aforementioned filtering based probe request/response operation.

When the STA transmits the probe request frame, the STA may include an information element (IE) with respect to signal strength in the probe request frame to provide the predetermined reference value used for an AP to determine whether to transmit the probe response frame.

FIG. 8 illustrates examples of IEs that can be used as the filtering information according to the present invention. The IEs shown in FIG. 8 may be included in the probe request frame.

FIGS. 8(a), (b) and (c) show examples using a received signal strength limit value as the filtering information. In these examples, the received signal strength limit value is represented probe request frame RSSI, recommended CINR and recommended SNR.

In the examples of FIG. 8, the element ID field may be defined to have a length of 1 octet and set to a value indicating that the corresponding IE relates to the filtering information (or received signal strength limit value). The length field may be defined to have a length of 1 octet and set to a value indicating the length of the following field.

The STA may set a predetermined received signal strength limit value in the probe request frame, transmitted (e.g. broadcast) to discover an AP, and transmit the probe request frame. In the example of FIG. 8(a), RSSI field of the probe request frame may be set to a value in the range of −100 dBm to 40 dBm, for example. Upon reception of the probe request frame including the RSSI field, the AP transmits the probe response frame when the received signal strength of the probe request frame exceeds the set value of the RSSI field and does not transmit the probe response frame when the received signal strength of the probe request frame is less than the set value of the RSSI field.

In the examples of FIGS. 8(b) and (c), the received signal strength limit value is represented as a CINR and SNR. The AP transmits the probe response frame only when the received signal strength of the probe request frame exceeds the received signal strength limit value.

Accordingly, since a case in which received signal strength of the probe request frame is less than a predetermined limit means that channel conditions between the STA and the AP are poor, the STA may not be associated with the AP even when the AP transmits the probe response frame to the STA and thus the probe response frame is likely to cause unnecessary traffic. According to the method of the present invention, generation of unnecessary traffic can be prevented to improve network performance and increase initial link setup speed.

According to an additional example of embodiment 2, the filtering information may be configured as information indicating only whether filtering according to received signal strength limit value is applied rather than being configured in the form of a received signal strength limit value. For example, the IEs shown in FIGS. 8(a), (b) and (c) may include information indicating whether RSSI/CINR/SNR based filtering is applied in an on/off manner instead of RSSI/CINR/SNR. In this case, the AP may not transmit the probe response frame when the RSSI of the probe request message transmitted by the STA or a CINR/SNR with respect to a signal transmitted by the STA is less than a predetermined reference value set in the AP and may transmit the probe response frame when the value exceeds the reference value. The reference value predetermined in the AP may be changed according to configuration of the AP.

Embodiment 3

The present embodiment is an example of the selective filtering based probe request/response scheme of embodiment 1 and relates to a method of using charging type information as the filtering information.

FIG. 9 illustrates another example of an IE that can be used as the filtering information according to the present invention.

Charging type information may be information indicating whether a network to which an AP belongs charges. In addition, the charging type information may be information indicating free of charge (e.g. part-time free of charge). In this case, the STA may selectively discover only an AP corresponding to a desired charging type (e.g. charged, free of charge, part-time free of charge, etc.) during AP discovery. To this end, the STA may include the IE as shown in FIG. 9 in the probe request frame and transmit the probe request frame including the IE. Upon reception of the probe request frame, an AP compares a charging policy (e.g. charged, free of charge, part-time free of charge or the like) of a network to which the AP belongs with charging type information included in the probe response frame, transmits a probe response frame when the charging policy matches the charging type information and does not transmit the probe response frame when the charging policy does not match the charging type information. Accordingly, it is possible to prevent the probe response frame from being transmitted from a network with which the STA will not be associated to prevent generation of unnecessary traffic, thereby improving network performance and increasing initial link setup speed.

The filtering information (received signal strength limit value) of embodiment 2 and the filtering information (charting type information) of embodiment 3 may be used together. For example, the filtering information may be configured such that the probe response frame is transmitted from only an AP having a received signal strength higher than a predetermined reference value from among APs of a free network.

Embodiment 4

In the aforementioned embodiments, the probe response frame is transmitted or not according to the filtering information (e.g. channel conditions (or received signal strength limit value) and/or charging type). The present embodiment provides a method of deferring transmission timing of the probe response frame according to the filtering information.

The present embodiment is described based on a case in which the filtering information corresponds to a received signal strength limit value. However, the scope of the present invention is not limited thereto and the principle of the present invention, described below, can be equally applied to a case in which filtering information of different attributes is used.

An AP may receive the probe request frame transmitted from the STA and defer transmission of the probe response frame when the received signal strength of the probe request frame is less than a received signal strength limit value (or recommended RSSI) included in the probe request frame.

Specifically, probe response frame transmission timing may be determined in the following manner.

When the received signal strength of the probe request frame exceeds the received signal strength limit value included in the probe request message, the probe response message may be immediately transmitted.

When the received signal strength of the probe request frame is less than the received signal strength limit value included in the probe request message, the probe response message may be transmitted after the lapse of a predetermined period of time. Here, the predetermined period of time may be determined as Tmax/n. Tmax denotes maximum channel monitoring time which corresponds to a time for which the STA monitors the probe response frame after transmitting the probe request frame. That is, when the STA fails to receive the probe response frame for Tmax after transmitting the probe request frame on a specific channel, the STA may perform a probe request/response operation on another channel. Tmax and/or n may be included in the probe request frame and transmitted or a value predetermined by the AP may be applied. The value n may be used as a parameter for determining a time for which probe response message transmission is deferred. That is, the probe response frame transmission deferment time of the AP may be controlled by adjusting n. For example, provided Tmax is a fixed value, n may be set to a large value when the AP needs to transmit the probe response frame after a short waiting time since selective filtering information is not satisfied. However, the probe response frame deferment time is not limited thereto and may be set in various manners.

In addition, when a first AP recognizes association of an STA with a second AP upon deferring probe response frame transmission since filtering conditions included in a probe request frame transmitted from the STA are not satisfied, the first AP may cancel probe response frame transmission to the STA.

The above-described fast link setup scheme using a first frame (e.g. probe request frame) including selective filtering information and a second frame (e.g. probe response frame) transmitted according to filtering information according to the present invention may be implemented such that the above-described various embodiments of the present invention can be independently applied or two or more thereof can be simultaneously applied, and description of redundant parts is omitted for clarity.

Figure 10:
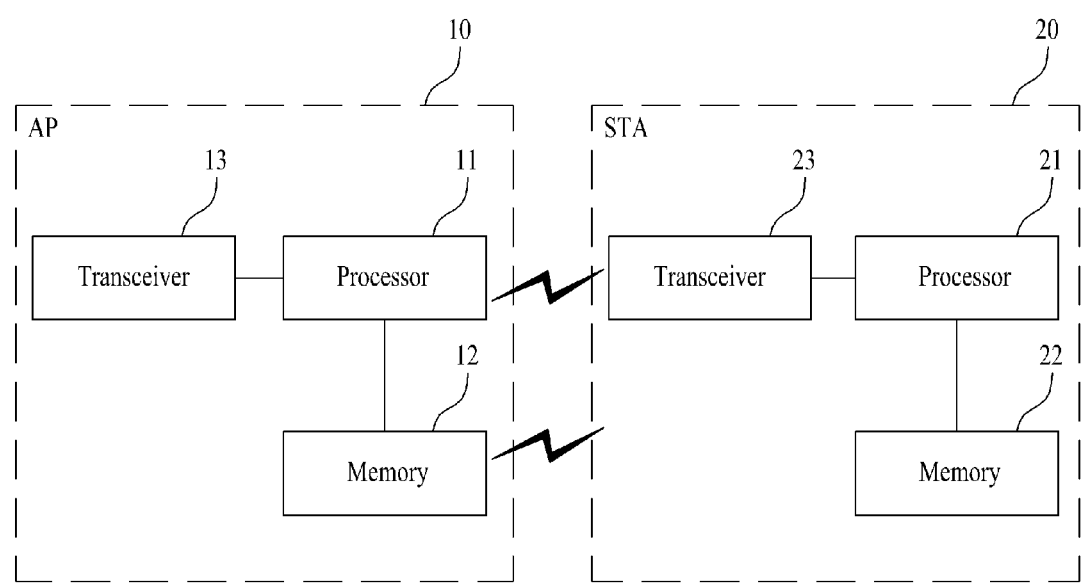
FIG. 10 is a block diagram illustrating exemplary configurations of an AP and an STA according to an embodiment of the present invention.

FIG. 10 is a block diagram showing exemplary configurations of an AP (or BS) and an STA (or terminal) according to an embodiment of the present invention.

An AP 10 may include a processor 11, a memory 12 and a transceiver 13. An STA 20 may include a processor 21, a memory 22 and a transceiver 23.

The transceivers 13 and 23 may transmit/receive RF signals and implement a physical layer according to IEEE 802, for example.

The processors 11 and 21 may be connected to the transceivers 13 and 23 and implement the physical layer and/or an MAC layer according to IEEE 802. The processors 11 and 21 may be configured to perform operations according to the aforementioned embodiments of the present invention or combinations of two or more thereof.

In addition, modules for implementing operations of the AP and the STA according to the aforementioned embodiments of the present invention may be stored in the memories 12 and 22 and executed by the processors 11 and 21. The memories 12 and 22 may be included in the processors 11 and 21 or provided to the outside of the processors 11 and 21 and connected to the processors 11 and 21 through known means.

Description of the AP 10 and the STA 20 may be respectively applied to a BS and a terminal in other wireless communication systems (e.g. LTE/LTE-A).

The aforementioned configurations of the AP and STA may be implemented such that the above-described various embodiments of the present invention can be independently applied or two or more thereof can be simultaneously applied, and description of redundant parts is omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The configuration of the processors 11 and 21 from among components of the AP/STA will now be described in more detail.

Figure 11:
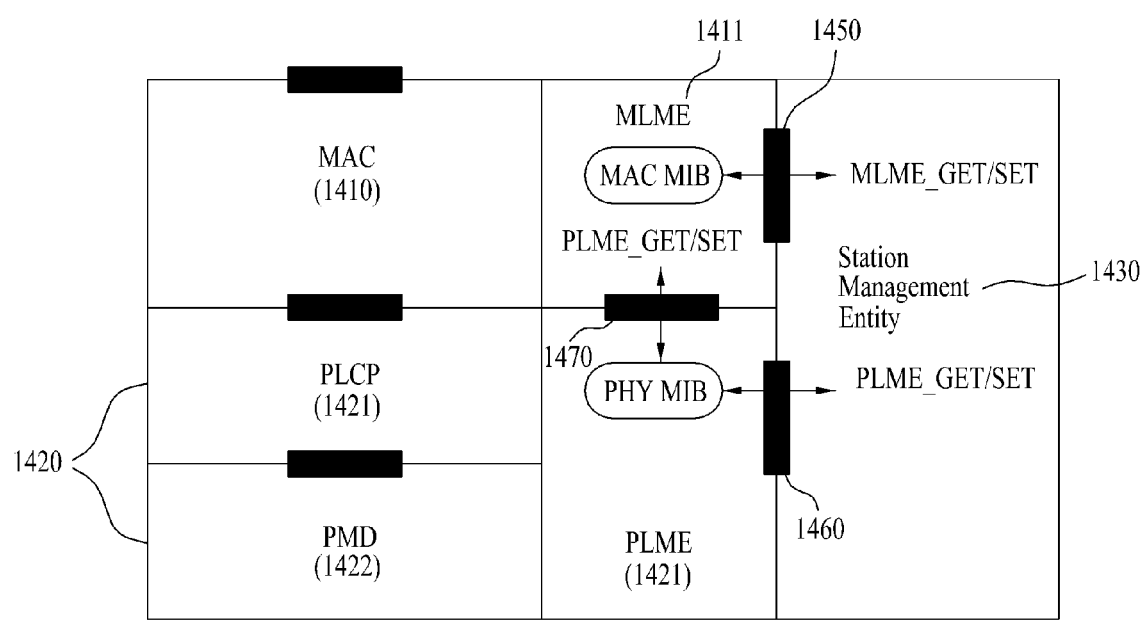
FIG. 11 illustrates an exemplary configuration of a processor of an AP or an STA according to an embodiment of the present invention.

FIG. 11 illustrates an exemplary configuration of the processor of the AP or STA according to an embodiment of the present invention.

The processor 11 or 21 of the AP or STA shown in FIG. 10 may include a plurality of layers. FIG. 15 shows a MAC sublayer 1410 and a physical layer (PHY) 1420 on a data link layer DDL from among the layers. As shown in FIG. 15, the PHY 1420 may include a PLCP (Physical Layer Convergence Procedure) entity 1421 and a PMD (Physical Medium Dependent) entity 1422. Both the MAC sublayer 1410 and PHY 1420 include management entities called MLME (MAC sublayer Management Entity) 1411. These entities 1411 and 14121 provide a layer management service interface having a layer management function.

To provide correct MAC operation, a SME (Station Management Entity) 1430 is present in each STA. The SME 1430 is a layer independent entity which can be regarded as being present in a separate management plane or as being off to the side. While functions of the SME 1430 are not described in detail herein, the SME 1430 collects layer-dependent states from various layer management entities (LMEs) and sets layer-specific parameters to similar values. The SME 1430 may execute these functions and implement a standard management protocol on behalf of general system management entities.

The entities shown in FIG. 11 interact in various manners. FIG. 11 illustrates examples of exchanging GET/SET primitives. XX-GET.request primitive is used to request a predetermined MIB attribute (management information based attribute information). XX-GET.confirm primitive is used to return an appropriate MIB attribute information value when a status field indicates "success" and to return error indication in the status field when the status field does not indicate "success". XX-SET.request primitive is used to request an indicated MIB attribute to be set to a predetermined value. When the MIB attribute indicates a specific operation, the MIB attribute requests the operation to be performed. XX-SET.confirm primitive is used to confirm that the indicated MIB attribute is set to a requested value when the status field indicates "success" and to return error conditions in the status field when the status field does not indicate "success". When the MIB attribute indicates a specific operation, it is confirmed that the operation has been performed.

As shown in FIG. 11, the MLME 1411 and SME 1430 can exchange various MLME_GET/SET primitives through a MLME_SAP 1450. In addition, various PLCM_GET/SET primitives can be exchanged between the PLME 1421 and the SME 1430 through a PLME_SAP 1460 and exchanged between the MLME 1411 and the PLME 1470 through a MLME-PLME_SAP 1470.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described embodiments of the present invention focus on IEEE 802.11, they are applicable to various mobile communication systems in the same manner.

The invention claimed is:

1. A method for performing, by a station (STA), fast link setup in a wireless communication system, comprising:
   transmitting, to one or more access points (APs), a first frame including filtering information; and
   receiving, from a portion or all of the APs, a second frame, wherein whether the second frame is transmitted is determined based on the filtering information, and
   wherein the filtering information includes a received signal strength limit value.

2. The method according to claim 1, wherein the portion or all of the APs include an AP having a received signal strength of the first frame, the received signal strength exceeding the received signal strength limit value.

3. The method according to claim 1, wherein the filtering information includes charging type information.

4. The method according to claim 3, wherein the portion or all of the APs include an AP conforming to a charging policy matching the charging type information.

5. The method according to claim 1, wherein an AP not satisfying conditions according to the filtering information defers transmission of the second frame.

6. The method according to claim 5, wherein configuration information about a time for which transmission of the second frame is deferred is included in the first frame.

7. The method according to claim 1, wherein the first frame is broadcast to the one or more APs.

8. The method according to claim 1, wherein the first frame is a probe request frame and the second frame is a probe response frame.

9. A method for supporting, by an AP, fast link setup in a wireless communication system, comprising:
   receiving a first frame including filtering information from an STA; and
   transmitting a second frame to the STA,
   wherein whether the second frame is transmitted is determined based on the filtering information, and
   wherein the filtering information includes a received signal strength limit value.

10. An STA performing fast link setup in a wireless communication system, comprising:
    a transceiver; and
    a processor,
    wherein the processor is configured to
       transmit, to one or more APs, a first frame including filtering information using the transceiver, and
       receive, from a portion or all of the APs, a second frame using the transceiver,
    wherein whether the second frame is transmitted is determined based on the filtering information, and wherein the filtering information includes a received signal strength limit value.

11. An AP supporting fast link setup in a wireless communication system, comprising:
a transceiver;
a processor,
wherein the processor is configured to
receive a first frame including filtering information from an STA using the transceiver, and
transmit a second frame to the STA using the transceiver,
wherein whether the second frame is transmitted is determined based on the filtering information, and
wherein the filtering information includes a received signal strength limit value.

* * * * *